United States Patent
Hakenberg et al.

(10) Patent No.: US 7,051,358 B2
(45) Date of Patent: May 23, 2006

(54) DATA TRANSMISSION IN NON-RELIABLE NETWORKS

(75) Inventors: Rolf Hakenberg, Langen (DE); Carsten Burmeister, Langen (DE); Thomas Wiebke, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 733 days.

(21) Appl. No.: 09/796,756

(22) Filed: Mar. 2, 2001

(65) Prior Publication Data
US 2001/0025239 A1    Sep. 27, 2001

(30) Foreign Application Priority Data
Mar. 2, 2000    (EP)    .................... 00104389

(51) Int. Cl.
  H04N 7/173    (2006.01)
  H04N 11/02    (2006.01)
  H04N 11/04    (2006.01)
  H04N 7/12     (2006.01)

(52) U.S. Cl. .......... 725/114; 725/116; 725/131; 375/240.26; 375/240.27

(58) Field of Classification Search ............ 725/114, 725/131, 144, 151, 116, 146; 375/240.12, 375/240.13, 240.14, 240.15, 240.27, 240.26
See application file for complete search history.

(56) References Cited

U.S. PATENT DOCUMENTS 5,167,035 A *   11/1992   Mann et al. ............... 714/4
5,528,284 A     6/1996    Iwami et al.
5,784,527 A     7/1998    Ort
5,974,028 A     10/1999   Ramakrishnan

FOREIGN PATENT DOCUMENTS

JP    10-262256    9/1998

OTHER PUBLICATIONS

S. Fukunaga et al., "Error Resilient Video Coding by Dynamic Replacing of Reference Pictures", Global Telecommunications Conference (Globecom), US, New York, IEEE, Nov. 18, 1996, pp. 1503-1508, XP000748704 ISBN: 0-7803-3337-3.

(Continued)

Primary Examiner—Vivek Srivastava
Assistant Examiner—Joseph G. Ustaris
(74) Attorney, Agent, or Firm—Wenderoth, Lind & Ponack, L.L.P.

(57) ABSTRACT

The present invention relates to a method and apparatus for transmitting video and/or audio data in a non-reliable and bandlimited network from a server to a client. The network may for instance be a wireless network. The data stream includes P-frames and I-frames. If during transmission a frame gets lost, the client notifies the server of the data loss when the next packet is received at the client correctly. The server then skips all the P-frames of the current P-frame sequence and continues the transmission with the next I-frame. Preferably, each packet has assigned a sequence number and the message from the client includes the sequence number of the currently received packet. The server may ignore a message from the client if the client's request for skipping the P-frames has already been executed. It is preferred to make use of the present invention for streaming MPEG data.

6 Claims, 6 Drawing Sheets

OTHER PUBLICATIONS

Shigeru Fukunaga et al., "Error Resilient Video Coding by Dynamic Replacing of Reference Pictures", Nov. 18, 1996, pp. 1503-1508.

T. Chujoh et al., "Error-Resilient Techniques for MPEG-4", Toshiba Review, vol. 57, No. 6, 2002, pp. 6-9 along with Partial English Translation.

* cited by examiner

DATA TRANSMISSION IN NON-RELIABLE NETWORKS

The present invention relates to a data transmission method apparatus and more particularly to video and/or audio streaming in a non-reliable and bandlimited network such as a wireless network.

An example of a data stream of multimedia packets is an MPEG (Motion Pictures Expert Group) stream. The MPEG stream consists of a flow of bit-packets called frames or packets and is streamed from the server to the client. The stream usually contains information in different formats and is therefore a mixture of independent data, so-called intra-coded frames or I-frames, and dependent data, which depends on preceding data, so-called predictive-coded frames or P-frames.

MPEG files which are stored on hard disks, CD-ROMs etc. are played back by MPEG playback devices which first retrieve the data from the storage device, decompress and decode the data to audio and video digital signals, and then reproduce the signals on the playback device such as a computer system. During playback of a selected MPEG audio/video playback file, many kinds of errors may occur, such as a fault in the memory or storage unit containing the playback file (e.g., a bad sector in a disk drive or CD-ROM drive), an error in a data path, or an error in data transmission due to a fault in an output unit of the computer system. In the prior art, playback devices have therefore been developed, which involve error recovery mechanisms. U.S. Pat. No. 5,784,527 discloses such error handling in an MPEG playback system. If an error occurs, one of the disclosed recovery processes includes skipping unimportant frames until an I-frame is reached.

A completely different problem as compared with the error recovery in an MPEG playback system is the data transmission in non-reliable and bandlimited networks. Typical examples of such networks are wireless networks which are inherently non-reliable since the wireless channels used for data transmission are error-prone, have limited bandwidth, and additionally the transmitted data is delayed or might even get lost due to network congestion. This is a severe problem in particular in real-time streaming of MPEG files.

FIG. 1 illustrates a conventional video streaming system. Video server 110 transmits video data through the non-reliable channel 150 to video client 160. For this purpose, the video server 110 includes a transmitter buffer unit 130 which receives data frames from video source application 120. In the transmitter buffer unit 130, the frames are then transmitted under control of channel access controller 140. In the video client 160 the data are received in a receiver buffer unit 170 which reassembles the frames from the segments. The video frames are then sent to video display application 180 which might for example likewise be a storage device, or the like.

The problems with the prior art systems when transmitting video or MPEG data via a non-reliable channel 150 will now be described in more detail with reference to FIG. 2. In this example, the server transmits a sequence of I-frames and P-frames to the client. For explanatory reasons, each frame is given a frame number (FN) indicating its position in the MPEG stream.

The server first transmits an I-frame, which is correctly delivered to the client after expiration of a certain time delay. The second frame is a P-frame, which is dependent on the I-frame. The P-frame is also correctly transmitted to the client.

The third frame is again a P-frame, which is therefore dependent on both the I-frame and the first P-frame. In the example of FIG. 2, P-frame FN=3 cannot be received at the client, e.g. because of a network congestion. The following frames nevertheless pass channel 150 with no error. Consequently, even though the server has transmitted all the frames, the client did receive frames FN=1, 2, 4–9, but not FN=3.

Since however P-frame FN=4 is dependent on P-frame FN=3, and the same is true for all the following P-frames up to the next I-frame, the client cannot use the P-frames although he has received them. This prior art system therefore is highly inefficient in its usage of network resources since a number of frames has been sent but cannot be used.

Another approach of streaming multimedia data through non-reliable channels involve the retransmission of packets. While this approach improves the QoS under bad channel conditions, it increases the required bandwidth in the network as well as the transmission delay. It is therefore not suitable for real-time multimedia streaming of data in networks having limited bandwidth and high error probability. Under such conditions, many retransmission attempts are required and the real-time requirements can no longer be fulfilled.

It is therefore the object of the invention to provide a method and apparatus for transmitting data in a non-reliable and bandlimited network, making efficient use of the limited bandwidth in case of data loss.

This object is solved according to the invention as defined in the independent claims.

According to the invention, the client notifies the server in case of packet loss. Thus, the present invention provides a feedback from the client to the streaming server, which allows the server to skip all the packets which depend on the lost P- or I-frame. This is advantageous in that it saves bandwidth which can now be spent on other uses in the network or which can be used for increasing the throughput of that data stream in which the packet loss has occurred.

The present invention further is advantageous in that it adopts techniques in a network which were previously known in the field of playback systems only, thereby providing a feedback interaction with the remote source.

Preferred embodiments of the present invention are defined in the dependent claims.

Assigning a sequence number to each packet leads advantageously to improved frame control capabilities. Further, incorporating the sequence number of the current packet into the non-acknowledgement command allows the server to take into account any signal delay in the network. This increases the reliability of the streaming system.

Preferred embodiments of the present invention will now be described in more detail with reference to the accompanying drawings in which.

Figure 1:
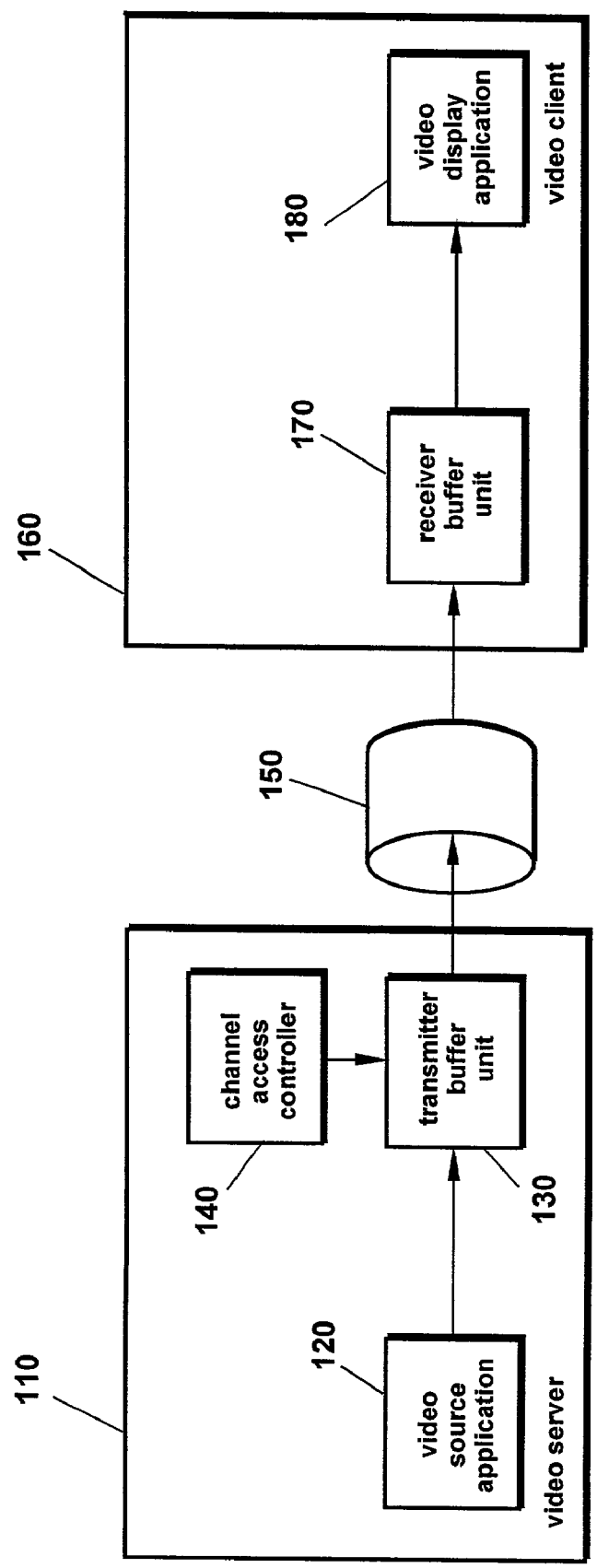
FIG. 1 is a prior art video streaming system.
Figure 3:
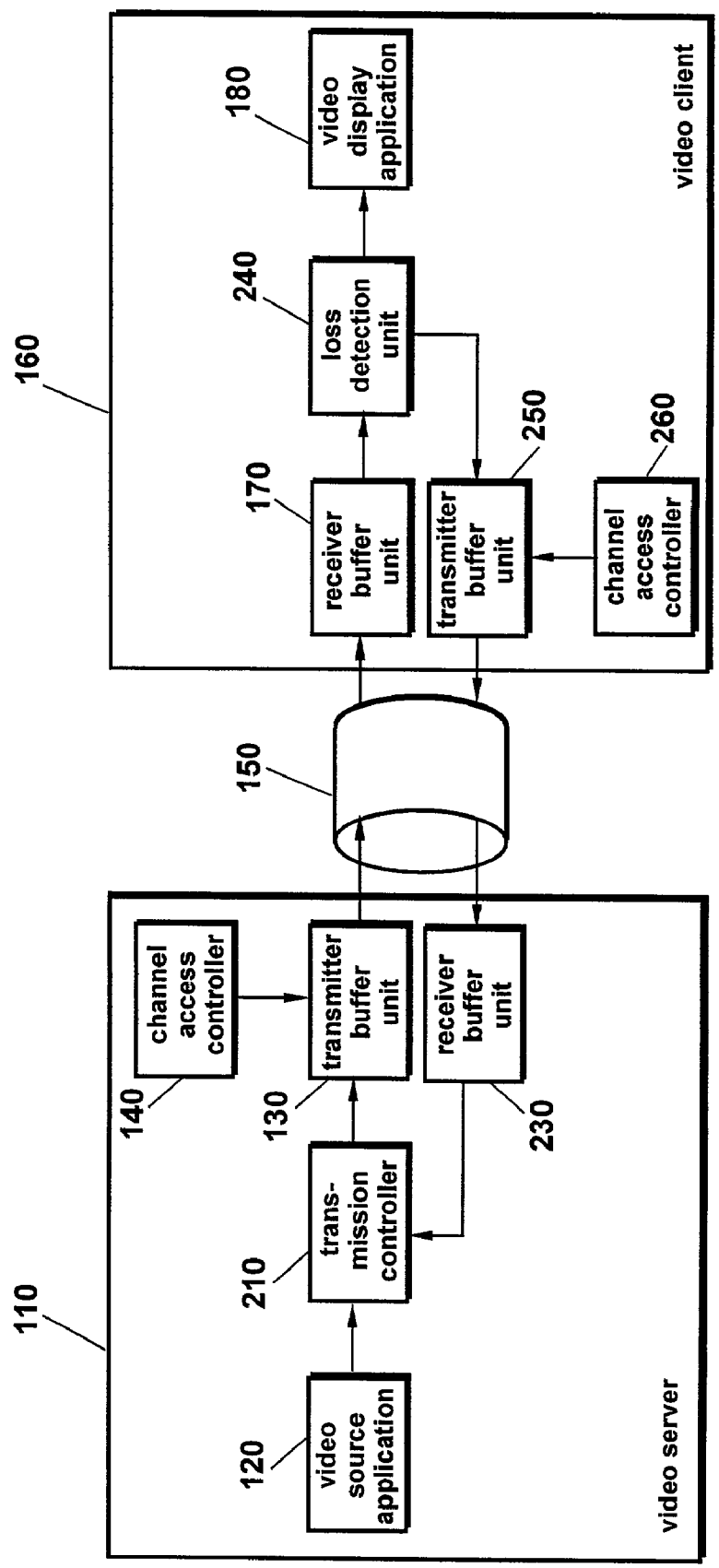
FIG. 3 is a video streaming system according to a preferred embodiment of the present invention.

Referring now to FIG. 3, the video streaming system according to the preferred embodiment of the present invention includes a video server 110 and a video client 160 which communicate via the non-reliable channel 150. The channel of the present embodiment is a wireless channel. Contrary to the video streaming system of FIG. 1, the video client 160 comprises a loss detection unit 240 for detecting that a frame is missing. The video client 160 further includes a transmitter buffer unit being controlled by channel access controller 260, for transmitting from loss detection unit 240 a non-acknowledgement (NACK) packet to the video server 110 in case of packet loss. For receiving the NACK packet from video client 160, video server 110 comprises a receiver buffer unit 230 which has access to transmission controller 210, which is connected to transmitter buffer unit 130.

Figure 4:
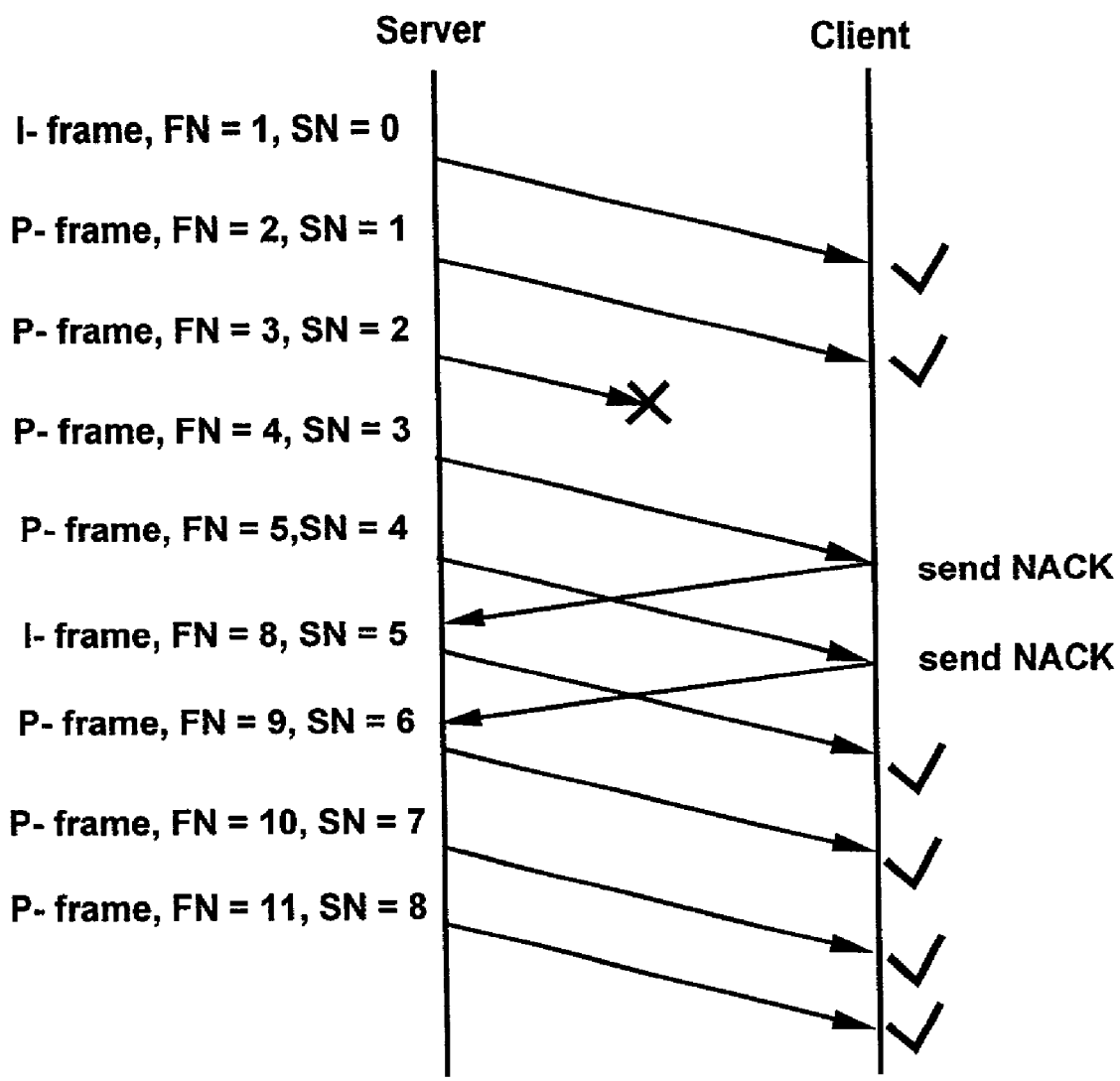
FIG. 4 is a message sequence chart for illustrating the operation of the video streaming system according to the present invention.

The operation of the video streaming system of FIG. 3 will now be described in more detail with reference to FIG. 4. FIG. 4 shows a message sequence chart according to the present invention. Initially, an I-frame is sent from the server to the client. In the example of FIG. 4, the I-frame has been given the sequence number SN=0, and the client is capable of reading this information. The I-frame is received properly at the client and may therefore be used for displaying purposes.

The second frame transmitted by the server is a P-frame, which is therefore dependent on the preceding I-frame. The P-frame has been given the sequence number SN=1 and is likewise correctly received at the client.

The following P-frame has the sequence number SN=2 and is lost during transmission. That is, the client cannot receive this P-frame.

Figure 2:
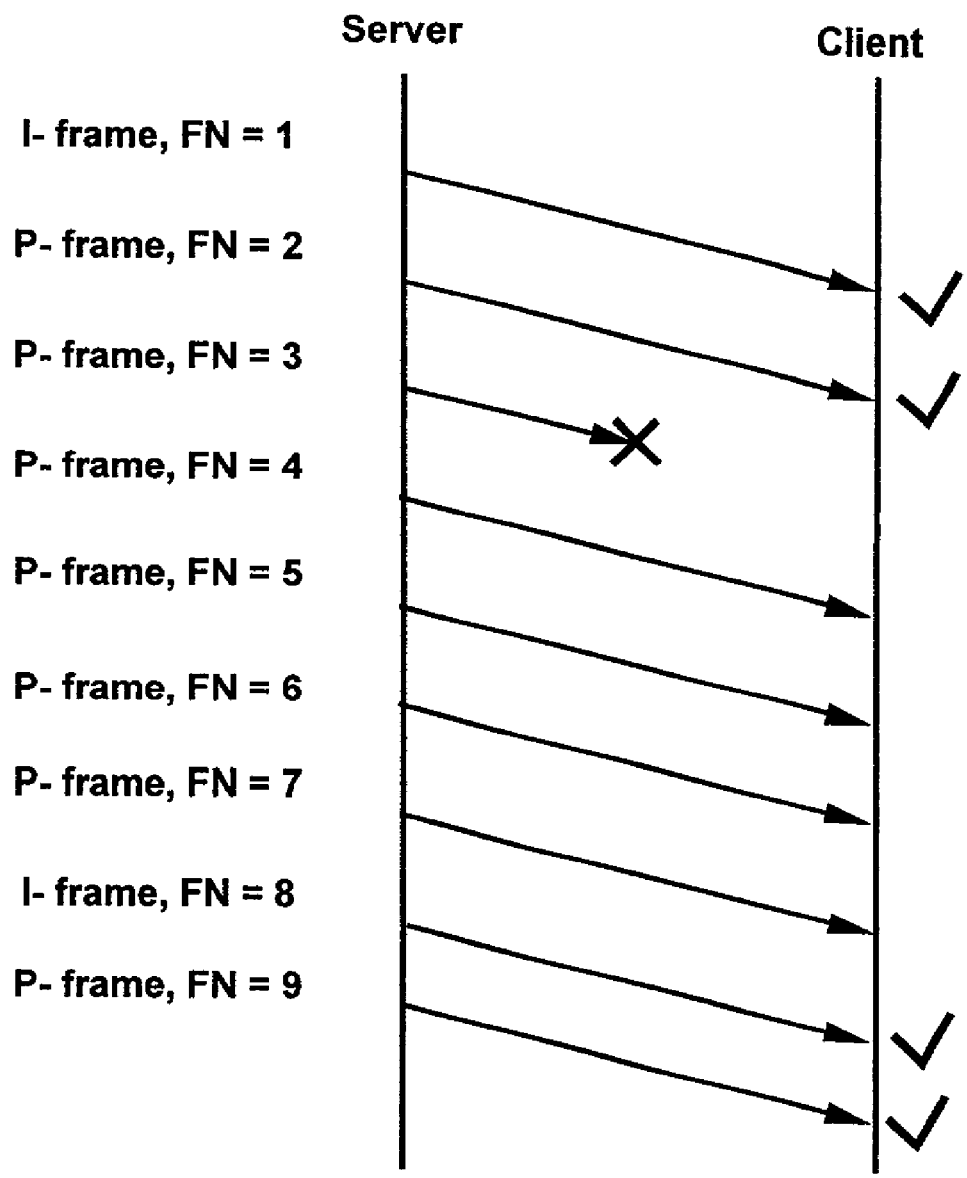
FIG. 2 is a message sequence chart illustrating the operation of the video streaming system of FIG. 1.

In the example of FIG. 4 and in accordance with the example of FIG. 2, the fourth frame, which is again a P-frame, is then transmitted from the server and is correctly received at the client. The client, in evaluating the sequence number, becomes aware that the preceding P-frame having the sequence number SN=2 is missing. The client then generates a NACK command including the sequence number of the currently received packet SN=3 and sends this NACK packet back to the server for notifying the server of the packet loss.

As can be seen from FIG. 4, due to the transmission delay of the connection, the NACK packet is received at the server later than the transmission time of the next P-frame having SN=4. This P-frame is therefore transmitted by the server in the usual manner.

When the client receives the P-frame SN=4, it again evaluates the sequence number and generates and sends back a NACK packet including the sequence number SN=4. Sending this second NACK packet not only is suitable for compensating for transmission delays but also takes into account that in non-reliable networks, even the first NACK packet may be destroyed due to e.g. network congestion.

The server receiving the first NACK packet is notified that a frame has not been received at the client. Since the client cannot make use of subsequent P-frames, the server skips these frames and continues transmission at the next I-frame. This frame which is then given the sequence number SN=5 corresponds to the I-frame which had in FIG. 2 for explanatory reasons the frame number FN=8.

Upon receiving the second NACK packet, the server determines by evaluating the sequence number that this command is already executed by skipping the P-frames FN=6 and 7. The server therefore ignores the second NACK packet and continues with transmitting the next P-frame FN=10 instead of again skipping all P-frames up to the next I-frame.

Figure 5:
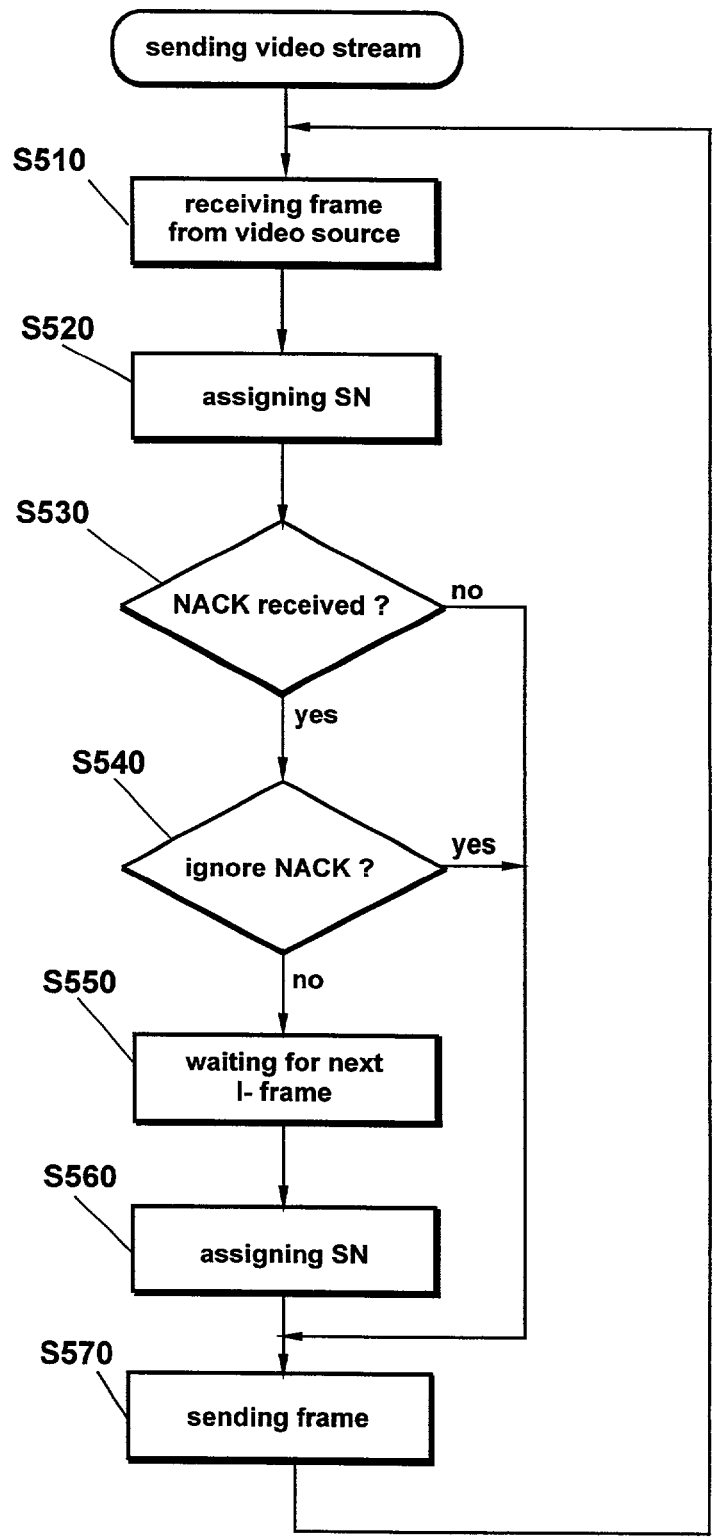
FIG. 5 is a flow chart illustrating the process of sending a video stream according to a preferred embodiment of the present invention.

The process of sending a video stream will now be explained with reference to FIG. 5.

In step S510, transmission controller 210 of video server 110 receives a frame from video source application 120, and assigns a sequence number to this frame in step S520. The sequence number may for instance be added to meta information included in the frame header, but it may be appreciated by those of ordinary skill in the art that any other kind of adding the sequence number to a packet may likewise be applicable.

It is then determined in step S530 whether a NACK packet has been received from the video client. If this is not the case, the frame is sent in step S570 to the transmitter buffer 130 and the process returns to step S510 for receiving the next frame from video source application 120.

If, however, in step S530 a NACK command has been received at receiver buffer unit 230, the transmission controller 210 determines in step S540 whether the NACK command has already been executed. If the NACK command has already been executed, the current frame is sent in step S570 to the transmitter buffer 130 and the process returns to step S510.

In case the NACK packet is the first one which has been received in the current P-frame sequence, the video server 110 determines in step S540 that the NACK command should not be ignored, and the processing continues with step S550. In this step, the transmission controller 210 waits for the reception of the next I-frame from video source application 120, thereby skipping the remaining P-frames of the current P-frame sequence. The received I-frame is then assigned a SN in step S560 and transmitted in step S570 before the process returns to step S510 for continuing transmission of the following P-frames.

Figure 6:
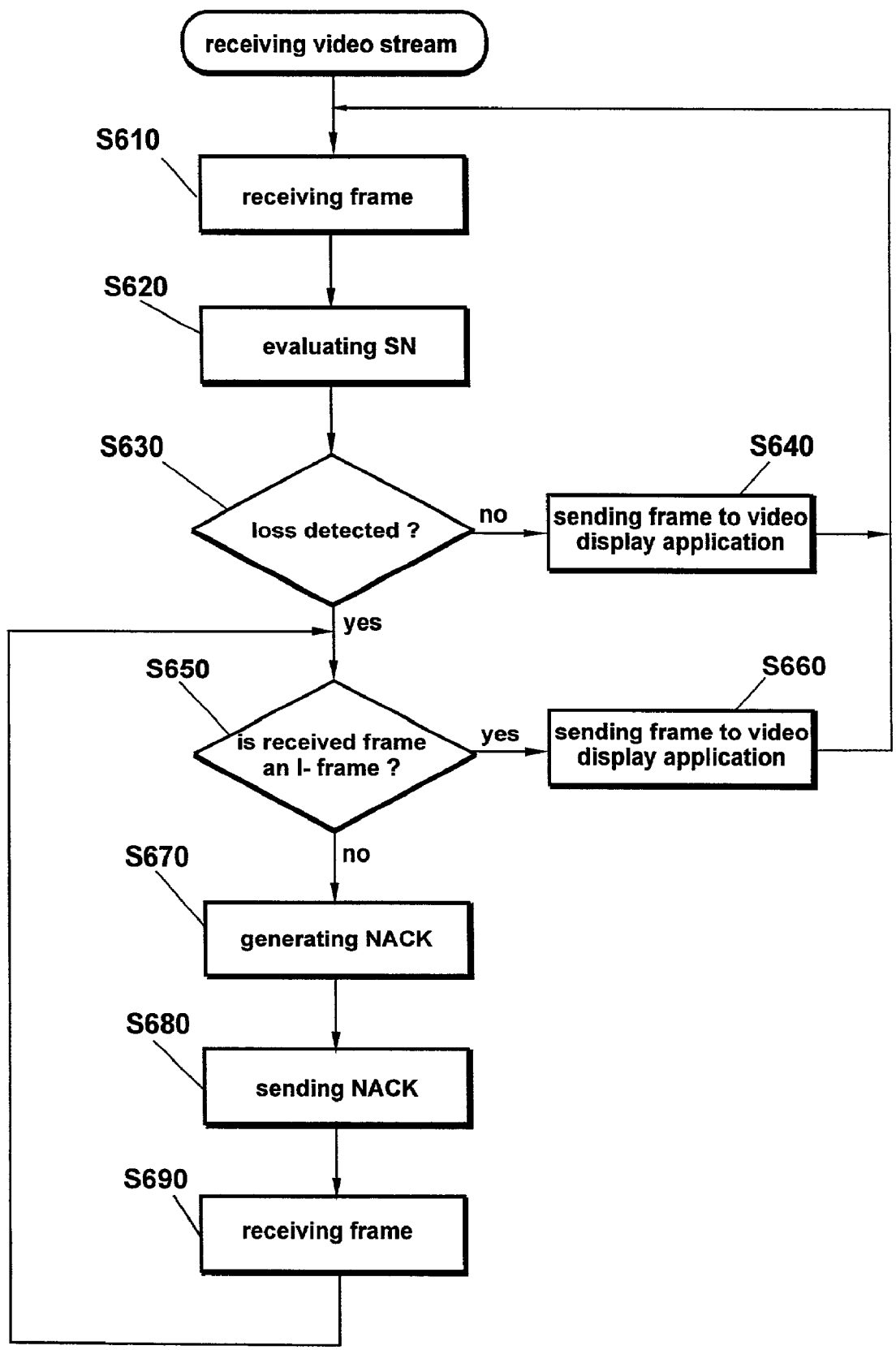
FIG. 6 is a flow chart illustrating the process of receiving a video stream according to the preferred embodiment.

Referring now to FIG. 6, the process of receiving a video stream at video client 160 is described. After receiving a frame in step S610, the sequence number of the frame is revealed and evaluated in step S620. If upon evaluating the sequence number it is determined that one of the preceding frames is missing (step S630) operation of the loss detection unit 240 passes control to step S640. If it determined in step S640 that the currently received data frame is an I-frame, the process sends in step S660 the frame to video display application 180 and returns to step S610 since there is no need to inform the video server of the data frame loss. Otherwise, the loss detection unit 240 generates an NACK packet in step S670 including the sequence number revealed in step S620. The generated NACK packet is then transmitted in step S680 by transmitter buffer unit 250 under control of channel access controller 260 through the channel 150 back to the video server 110.

If it is determined in step S630 that no frame is missing, the video client 160 adds the frame to the stream and forwards in step S640 the frame to video display application 180. The process of FIG. 6 then returns to step S610 for receiving the next video frame from video server 110.

While the preferred embodiment of the present invention has been described in the context of streaming video data, it will be appreciated by those of ordinary skill in the art that another preferred embodiment may alternatively or additionally focus on streaming audio data. Preferably, the data stream is an MPEG data stream.

Further, the present invention has been described as preferably operating in a wireless network. Wireless networks include any kind of networks in which data is transmitted through space by electromagnetic waves, including radio communication and cordless transmissions. The invention may however likewise be applied to data transmission over any other kind of non-reliable channels.

The invention claimed is:

1. A method for transmitting a data stream including video and/or audio data in a non-reliable network from a server to a client, the data stream comprising data frames including P-frames and I-frames, the method comprising:

transmitting the data stream from the server;

receiving a non-acknowledgment message indicating that at least one P-frame of the data stream has not been received, the non-acknowledgment message being received by the server from the client through the non-reliable network; and in response to receiving the non-acknowledgment message, skipping transmission of the P-frames, including the at least one P-frame, up to a next I frame which follows the at least one P-frame in the data stream, and continuing transmitting of the data stream beginning with the next I-frame.

2. The method according to claim 1, further comprising:

ignoring a subsequent non-acknowledgment message from the client indicating that said at least one P-frame has not been received if the non-acknowledgment message has already been received from the client.

3. The method according to claim 1, wherein the non-acknowledgment message includes a sequence number of a received P-frame that follows the at least one P-frame in the data stream, said method further comprising:

evaluating the sequence number to determine if said skipping has already been executed, and if said skipping has already been executed, ignoring the non-acknowledgment message.

4. A server for transmitting a data stream including video and/or audio data in a non-reliable network from said server to a client, the data stream comprising data frames including P-frames and I-frames, said server comprising:

a transmitter operable to transmit the data stream from said server;

a receiver operable to receive a non-acknowledgment message indicating that at least one P-frame of the data stream has not been received, the non-acknowledgment message being received by said receiver from the client through the non-reliable network; and a controller operable, in response to the non-acknowledgment message being received, to skip transmission of the P-frames, including the at least one P-frame, up to a next I frame which follows the at least one P-frame in the data stream, and to continue transmission of the data stream beginning with the next I-frame.

5. The server according to claim 4, wherein said controller is operable to ignore a subsequent non-acknowledgment message from the client indicating that said at least one P-frame has not been received if said server has already received the non-acknowledgment message from the client.

6. The server according to claim 4, wherein:

the non-acknowledgment message includes a sequence number of a received P-frame that follows the at least one P-frame in the data stream; and said controller is operable to evaluate the sequence number to determine if the skipping of the P-frames including the at least one P-frame has already been executed, and to ignore the non-acknowledgment message if the skipping has already been executed.

* * * * *